(12) United States Patent
Paternoster et al.

(10) Patent No.: US 6,688,038 B1
(45) Date of Patent: Feb. 10, 2004

(54) MULCH COMPOSITION AND METHOD

(75) Inventors: Joseph Paternoster, Santa Rosa, CA (US); Harold Jensen, Santa Rosa, CA (US)

(73) Assignee: DriWater, Inc., Santa Rosa, CA (US)

( * ) Notice: Subject to any disclaimer, the term of this patent is extended or adjusted under 35 U.S.C. 154(b) by 0 days.

(21) Appl. No.: 09/645,995

(22) Filed: Sep. 15, 1999

Related U.S. Application Data

(63) Continuation-in-part of application No. 09/096,597, filed on Jun. 12, 1998, now abandoned.

(51) Int. Cl.$^7$ ............................................. C09K 17/52
(52) U.S. Cl. ............................................................ 47/9
(58) Field of Search ................................................. 47/9

(56) References Cited

U.S. PATENT DOCUMENTS

| | | | |
|---|---|---|---|
| 3,409,550 A | * | 11/1968 | Gould |
| 3,973,355 A | * | 8/1976 | McKenzie |
| 4,297,810 A | * | 11/1981 | Hansford .......................... 47/9 |
| 4,676,196 A | * | 6/1987 | Lojek et al. .................... 119/1 |
| 4,865,640 A | * | 9/1989 | Avera ............................ 71/23 |
| 4,931,139 A | * | 6/1990 | Phillips ....................... 162/100 |
| 5,057,168 A | * | 10/1991 | Muncrief ................... 156/62.6 |
| 5,082,500 A | * | 1/1992 | Nachtman et al. .......... 106/900 |
| 5,188,064 A | * | 2/1993 | House ......................... 119/172 |
| 5,339,769 A | * | 8/1994 | Toth et al. .................. 119/173 |
| 5,998,491 A | * | 12/1999 | Haar, Jr. ..................... 521/164 |
| 6,029,395 A | * | 2/2000 | Morgan ............................ 47/9 |
| 6,076,299 A | * | 6/2000 | Spittle et al. ..................... 47/9 |

FOREIGN PATENT DOCUMENTS

EP 0620204 A1 * 10/1994

OTHER PUBLICATIONS

Senese, Fred. What are triclocarban and troclosan (ingredients in some antiseptic soaps)? undated. found at http://antoine.fsu.umd.edu/chem/senese/101/consumer/faq/triclosan.shtml.*

Hawley (ed.), the Condensed Chemical Dictionary, ninth ed., 1977, pp. 31, 34.*

* cited by examiner

Primary Examiner—Peter M. Poon
Assistant Examiner—Jeffrey L. Gellner
(74) Attorney, Agent, or Firm—Michael E. Dergosits

(57) ABSTRACT

A mulch composition having extended moisture retention time and a method for use thereof are provided. In a first preferred embodiment of the present invention, a hydro mix moisturizing agent is added to a seeded mulch. The preferred embodiment comprises 93.95% of water, 5.85% of mulch, and 0.2% moisturizing agent by weight as a percentage of the weight of the water used, and fertilizer and seed in any selected amounts. In this preferred embodiment, the moisturizing agent comprises a cellulose gum, a cross-linker, and a surfactant. The moisturizing agent retains water in the mulch composition and releases water into the soil surface at a controlled rate while binding together the mulch composition. Moisture is retained for a longer amount of time than the prior art mulch compositions to promote maximum seed germination. The mulch composition according to the present invention additionally provides effective dust and erosion control properties.

28 Claims, No Drawings

MULCH COMPOSITION AND METHOD

This application is a continuation-in-part of application Ser. No. 09/096,597 filed Jun. 12, 1998, now abandoned.

BACKGROUND OF THE INVENTION

1. Field of the Invention

The present invention relates to a mulch for use in seeding. More specifically, the present invention relates to a composition and method for providing a seeding mulch having extended moisture retention time.

2. Description of Related Art

The problem of maintaining a soil moisture content sufficient to sustain a growing plant has long been recognized. Sprayable mulches have been used to provide protection for the seed to promote the germination of seed on the soil surface. In a mulch, relatively large particles, such as wood fibers, straw, and sawdust, are mixed with water to form a slurry. A typical slurry mixture includes approximately 100 gallons of water for each 50 pounds of solid mulch, with fertilizer and seed added in amounts recommended by the suppliers. The slurry is then pumped through a hose and nozzle and sprayed onto the soil surface.

Binding agents, known as "tackifiers" are typically added to bind the slurry. The structural integrity of mulch is enhanced by the addition of the tackifier. Such an enhanced mulch is used to advantage for erosion control. Under normal conditions, sprinkler irrigation must be established within one day after the application of the mulch and seed.

Seeds can additionally be incorporated into the slurry mixture. The mulch protects the seeds from the weather and from being consumed, for example, by birds or insects. The mulch also protects the soil surface by preventing the topsoil from eroding during adverse weather conditions such as wind or rain storms. The water retained by the mulch nourishes the seeds to promote germination.

The water retention of prior art mulches is limited by the absorptive capacity of the solid mulch material. The thickness of the mulch applied to the soil surface must be increased to increase the amount of retained water. However, this increased thickness can inhibit the growth, of vegetation.

The amount of water retained by the prior art mulches is also determined by the weather. For example, in arid, windy areas, the mulch dries rapidly. If an irrigation system, such as sprinkler irrigation, is not established quickly, the mulch can dry out before the seed has germinated. The dried mulch can then either blow away in the winds, or form a hardened surface that inhibits the growth of new vegetation.

Moisturizing agents have been used to solve the problems inherent to manual and automatic watering systems. A moisturizing agent releases moisture into its immediate vicinity. One such moisturizing agent is described in Avera, Moisturizing Agent, U.S. Pat. No. 4,865,640. The Avera moisturizing agent is a gel-like product that appears dry to the touch and semi-solid in appearance. This moisturizing agent can contain approximately 98% of water bound in solid form.

The solid bound water is gradually converted to liquid water when placed in the microbial environment of natural soils. The bacteria and other microorganisms that liquefy this bound water do not migrate into the gel but act on its exposed surface. The liquefaction rate of moisturizing agents such as that taught by Avera can therefore be controlled by controlling the amount of moisturizing agent surface area that is exposed to the soil.

It would therefore be an advantage to provide a mulch that retains sufficient water content to insure maximum seed germination. It would be a further-advantage to provide a mulch that distributes water to the soil surface at a controlled rate.

SUMMARY OF THE INVENTION

The present invention is a mulch composition having extended moisture retention time and a method for use thereof. The mulch composition according to embodiments of the present invention comprises water, mulch, and moisturizing agent. Seed and fertilizer can be added according to the particular requirements for the mulch composition. The preferred embodiment comprises 93.95% water, 5.85% mulch, and 0.20% moisturizing agent by weight as a percentage of the weight of the water used, and fertilizer and seed in any selected amounts. In this preferred embodiment, the moisturizing agent comprises a cellulose gum (preferably 92.95% cellulose gum), a cross-linker (preferably 7.00% aluminum sulfate), and a surfactant (preferably 0.5% Smashing Whited® Water Softener & Detergent Booster).

The moisturizing agent according to the preferred embodiment is added to the mulch composition in lieu of a tackifier. The moisturizing agent releases water into the soil surface at a controlled rate while binding the mulch composition together.

The present invention retains moisture for a longer amount of time than the prior art mulches. Maximum seed germination can therefore be promoted. In addition, the present invention provides effective dust and erosion control properties.

DETAILED DESCRIPTION OF THE INVENTION

The present invention is a seeding mulch composition having extended moisture retention time and a method for use thereof. The present invention retains moisture for a longer amount of time than the prior art mulches. Maximum seed germination can therefore be insured.

For purposes of this application, the following definitions will be used. The term "mulch" describes a material that is used to coat soil. Mulch can retain water for distribution to the soil and can also inhibit the erosion of the underlying soil. Mulch can include fibrous matter such as wood fiber or shredded newsprint. Mulch can also include other materials such as fertilizer and seed. The term "mulch composition" is used to describe the present invention, namely, a mixture of a mulch and a moisturizing agent. The term "moisturizing agent" is used to refer to a substrate that gradually releases water and optionally air when interacting with biological organisms present in the environment of the object, for example, plant tissue, receiving the water and air. One such moisturizing agent is disclosed in U.S. Pat. No. 4,865,640. A moisturizing agent releases water and, optionally, air into the soil surface at a controlled rate, for example, when interacting with biological organisms typically found in soil.

The mulch composition according to embodiments of the present invention comprises water, mulch, and moisturizing agent. The amount of mulch can range from 4.39% to 7.3% and the amount of hydro mix moisturizing agent can range from 0.5% to 0.35%. The mulch composition according to the preferred embodiment of the present invention comprises 93.95% water, 5.85% mulch, and 0.20% moisturizing agent by weight as a percentage of the weight of the water used, and fertilizer and seed in any selected amounts. As an example, the mulch composition according to the preferred embodiment can comprise 800 lbs. of water (100 gallons),; 50 lbs. of mulch (1 standard size bag), and 1.6 lbs. moisturizing agent.

In the preferred embodiment, the mulch is preferably Excel® Fibermulch or Fibercel™ Mulch, both of which are currently manufactured by the American Excelsior Company of Arlington, Tex. However, the teachings of the present invention can also be applied to any suitable mulch.

Seed and fertilizer can also be added to the mulch composition as required for particular applications. For example, a mulch composition for use in erosion control can comprise 0.375 lb to 1.1 lbs. of seed per 800 lbs of water (100 gallons). A mulch composition for pasture land can comprise 0.75 lb of seed per 800 lbs of water and a mulch composition for lawns can comprise 10.75 lbs per 800 lbs of water. The amount of fertilizer added to the mulch composition can vary from 4 to 8 lbs per 800 lbs of water.

The moisturizing agent used in the preferred embodiment of the present invention a dry mixture of:

92.95% cellulose gum;

7.00% aluminum sulfate; and 0.05% Smashing White® Water Softener & Detergent Booster ("Smashing White").

For purposes of this application, this preferred moisturizing agent will be referred to herein as the "hydro mix moisturizing agent." The term "hydro mix moisturizing agent" is for descriptive purposes only and is not intended to limit in any way the scope of the claimed invention. The hydro mix moisturizing agent is advantageous because, when added to the other components of the mulch composition, such as mulch, seed, fertilizer, and water, the hydro mix moisturizing agent has excellent tackifier and water retention properties.

Table 1 lists examples of the mulch composition according to different embodiments of the present invention.

TABLE 1

| EX-AM-PLE | WATER (in lbs) (800 lbs = 100 gal) | MULCH (in lbs) | SEED | FERTILIZER | HYDRO MIX |
|---|---|---|---|---|---|
| 1 | 800 | 50 | per specifications | per specifications | 0.05% |
| 2 | 800 | 50 | per specifications | per specifications | 0.1% |
| 3 | 800 | 50 | per specifications | per specifications | 0.15% |
| 4 | 800 | 50 | per specifications | per specifications | 0.2% |
| 5 | 800 | 50 | per specifications | per specifications | 0.25% |
| 6 | 800 | 50 | per specifications | per specifications | 0.3% |

The amount of seed and/or fertilizer, if any, in the mulch composition according to the present invention has little effect, if any, on the integrity of the mulch composition. However, the function of the hydro mix moisturizing agent does vary according to its percentage in the mulch composition. Thus, for Examples 1 and 2 of Table 1, the hydro mix moisturizing agent functions primarily as a tackifier. A tackifier functions essentially as a glue that holds the mulch composition together, thereby reducing, if not preventing, the effects of wind and water erosion on the mulch composition. However, a tackifier typically has little or no effect on the water retention properties of the mulch composition.

As the percentage of hydro mix moisturizing agent increases as shown in Examples 3 through 6 of Table 1, the hydro mix additionally serves to retain water in the mulch composition, in addition to its function as a tackifier. The water retention property of the mulch composition of Example 3 is fair, the water retention property of the Example 4 mulch composition is good, that of Example 5 is excellent, while the water retention property of Example 6 is superior.

In the preferred embodiment of the present invention, the hydro mix moisturizing agent is added to the mulch composition in lieu of an additional tackifier, such as guar. In the mulch composition according to the preferred embodiment, the hydro mix moisturizing agent comprises approximately 0.1% to 0.3% by weight as a percentage of the weight of the water used (3.6–10.8 grams hydro mix per 8 lbs of water) and preferably 0.3%, as shown in Example 6 of Table 1.

In this range, the hydro mix moisturizing agent does not form a gel. As a result, the hydro mix moisturizing agent component of the mulch composition tends to bead and run off a surface on which the mulch composition is sprayed and would not remain mixed with the other components of the mulch composition. Therefore, in the preferred embodiment, a surfactant is added to the moisturizing agent to break the surface tension of the hydrated hydro mix moisturizing agent. Breaking the surface tension causes the hydro mix moisturizing agent to flow and to coat the surface on which it is sprayed. The hydro mix moisturizing agent remains mixed with the other components of the mulch composition to slow the rate of water evaporation from the mulch composition, thereby extending the period of moisture retention.

The Smashing White, which is distributed by the AMWAY Corporation, functions as the surfactant for the preferred embodiment of the mulch composition. While the hydro mix moisturizing agent preferably includes 0.5% of the Smashing White, in alternative embodiments the percentage of Smashing White can range from approximately 0.3% to 0.8% by weight.

One skilled in the art will readily recognize that other surfactants can also be used with the present invention. For example, in one embodiment, only the active ingredients of Smashing White, Sodium Sesquicarbonate and Sodium Tripolyphosphate, are added to the hydro mix moisturizing agent.

In yet another embodiment of the present invention, Nova Clean, which is manufactureed by Micro Nova and which includes the active ingredient Novasan, is used instead of or in combination with the Smashing White. In this embodiment, the percentage of Novasan or the Novasan/Smashing White mixture is also preferably 0.5%. However, the percentage of Nova Clean can range from approximately 0.3% to 0.8% by weight.

While the hydro mix moisturizing agent according to the preferred embodiment of the present invention includes 92.95% cellulose gum, in alternative embodiments the percentage of cellulose gum can range from approximately 85% to 95%. When the cellulose gum is wet, it becomes sticky and clings to the mulch. The aluminum sulfate component of the hydro mix moisturizing agent functions as a "cross-linker" to cause the molecules of water to cling to the molecules of cellulose gum. While the preferred embodiment of the hydro mix comprises 7.00% aluminum sulfate, in alternative embodiments the percentage of aluminum sulfate can range from approximately 5.00% to 15%. In yet other embodiments of the invention, in lieu of the aluminum sulfate, the cross-linker can be a hydrated metallic salt such as zinc sulfate, indium sulfate, cadmium sulfate, and gallium sulfate in the same percentage as aluminum sulfate.

In the preferred embodiment of the present invention, the hydro mix moisturizing agent is added to the other components of the mulch composition in an anhydrous form, preferably a powder. However, the anhydrous hydro mix moisturizing agent can be used in any other suitable form, including but not limited to granular or chunk forms.

In an alternative embodiment of the present invention, a hydrated moisturizing agent is mixed with the mulch, rather than an anhydrous moisturizing agent. In this embodiment, the moisturizing agent is hydrated by being mixed with water and is then poured in a tank to be mixed with the other ingredients of the mulch composition. In this embodiment, it is preferred that the hydrated moisturizing agent be mixed such that it remains a liquid capable of being poured. For example, the hydrated moisturizing agent can be mixed such that it has the consistency of a thin syrup.

The hydro mix moisturizing agent can be used for purposes other than to be mixed with the mulch to form the mulch composition. For example, the hydro mix moisturizing agent can be used as a fire retardant. In this embodiment, hydrated hydro mix moisturizing agent alone is applied to a surface that is to be protected from fire. The water released from the hydro mix moisturizing agent retards the spread of fire over the protected surface. The hydro mix moisturizing agent can be applied to the surface by any appropriate means, including but not limited to spraying, dipping, brushing, dusting, and sprinkling.

In one example, the hydro mix moisturizing agent can be applied to flammable areas in the path of a wild fire. The hydro mix moisturizing agent will leave a wet film on the flammable areas for an extended period of time. The time that the flammable areas will remain moist is dependent in part upon the formulation of the hydro mix moisturizing agent.

The preferred fire retardant comprises 0.35% anhydrous hydro mix by weight and 99.65% water. However, in alternative embodiments, the amount of anhydrous hydro mix moisturizing agent can vary in a range of from 0.2% to 0.7% by weight as a percentage of weight of water used. The length of time that the moisture will be retained on the flammable surface increases along with the percentage of anhydrous hydro mix moisturizing agent in the formulation. The desired formulation can be selected according to the intensity of the fire and according to atmospheric conditions such as wind velocity.

The anhydrous hydro mix moisturizing agent preferably comprises:

92.8% cellulose gum;

7.00% aluminum sulfate; and 0.2% surfactant, such as Smashing White.

In alternative embodiments of the present invention, the percentage of cellulose gum used in the anhydrous hydro mix moisturizing agent can range from approximately 85%–95% by weight. The percentage of aluminum sulfate can range from approximately 5.00%–15% by weight, and the percentage of surfactant can range from approximately 0.1%–0.25%.

In yet another embodiment, the hydro mix moisturizing agent can be directly applied to soil. In this embodiment, the hydro mix moisturizing agent is used to provide moisture directly to the soil, for example, to irrigate crops or planted seeds. The hydro mix moisturizing agent can be applied to the soil by any appropriate means, including but not limited to spraying, dipping, brushing, dusting, and sprinkling. In one embodiment, the hydro mix moisturizing agent is hydrated prior to being applied to the soil. In this embodiment, approximately 0.5% to 0.3% anhydrous hydro mix is mixed with approximately 800 lbs. water. Alternatively, the hydro mix moisturizing agent can be applied to the soil in an anhydrous form. Water can then be added, for example, by spraying the hydro mix moisturizing agent. The hydro mix moisturizing agent will retain water for controlled release to the soil.

In yet another embodiment, the hydro mix moisturizing agent can be used as an additive to the core of a battery. Batteries are typically compression-formed in a dry state. After the core is formed, it is desirable to absorb moisture into the core to improve the life of the battery. To date, battery manufacturers have been unsuccessful in their attempts to absorb water into the battery core. This problem can be solved by mixing anhydrous hydro mix moisturizing agent with the battery core material prior to compression. After the core is formed, the hydromix moisturizing agent will absorb moisture back into the core by capillary action. The surfactant component of the hydro mix moisturizing agent is used to release the surface tension to allow the moisture to be absorbed back into the center of the battery core.

In this embodiment, the anhydrous hydro mix moisturizing agent preferably comprises:

94.9% cellulose gum;

5.00% aluminum sulfate; and 0.1% surfactant, such as Smashing White.

In alternative embodiments, the percentage of cellulose gum can range from approximately 90%–95% by weight. The percentage of aluminum sulfate can range from approximately 5%–10% by weight, and the percentage of surfactant can range from approximately 0.75%–0.2% by weight.

In the preferred embodiment, anhydrous hydro mix moisturizing agent is added to the battery core material in an amount of 0.5% by weight as a percentage of the weight of the battery core material. In alternative embodiments, the amount of anhydrous hydro mix moisturizing agent mixed with the battery core material can vary from approximately 0.4%–0.8% as a percent of the weight of battery core material.

While the hydro mix moisturizing agent is used in the preferred embodiment of the present invention, any other appropriate moisturizing agent can be used, such as the cellulosic compounds disclosed in Avera, Moisturizing Agent, U.S. Pat. No. 4,865,640 ("the '640 patent"). The moisturizing agent disclosed in the '640 patent is a mixture of cellulosic compound with carboxylic groups substituted on glucose units of the cellulosic chain through an ether linkage. The cellulosic compound is admixed with a hydrated metallic salt and then with aerated water to form a high viscosity substance that gradually releases water and air when interacting with biological organisms typically found in soil.

The moisturizing agent disclosed in the '640 patent comprises a mixture of:

(a) cellulosic compound ranging from 1–3% by weight (as a percentage of the weight of water used) and having an average molecular weight ranging between 90,000 and 700,000 represented by the formula:
      R—O—COOM, in which "M" is a metal substituted for hydrogen on the carboxyl group of the cellulosic compound and "R" is a cellulosic chain;

(b) a hydrated metallic salt ranging from 0.1–0.3% by weight (as a percentage of the weight of water used); and (c) water ranging from 0.97–99% by weight.

The water can optionally be aerated. The metal substituted on the carboxyl group can include such metals as lithium, sodium, potassium, rubidium, and cesium. The hydrated salt can include such salts as aluminum sulfate, zinc sulfate, indium sulfate, cadmium sulfate, and gallium sulfate, with water being held mechanically to the salt molecule.

A surfactant can also be added to the moisturizing agent disclosed in the '640 patent. One exemplary embodiment that includes surfactant comprises a mixture of:

97.85% Water 2.0% Cellulose Gum 0.15% Aluminum Sulfate

To this mixture is added 0.5 oz. Original Palmolive® Liquid dishwashing soap per each 500 gallons of water used.

The Original Palmolive dishwashing soap, manufactured by the Colgate-Palmolive Company, contains the surfactant Sodium Laurel Sulfate. In this exemplary hydrated embodiment, however, the surfactant is only included for its properties in preventing the moisturizing agent from sticking to the sides of its container.

In another embodiment of the present invention, a tackifier is added to the mulch composition. The preferred tackifier is guar, although any other suitable vegetable gum or tackifier can also be used to bind the mulch.

The present invention can be illustrated by the following test examples. These test examples are for explanatory purposes only and are not intended to limit the scope of the invention disclosed herein.

TEST EXAMPLES 1–7

The tests in Test Examples 1–7 were performed in 12 inch by 24 inch fish tanks. The tanks were filled with various types of dry soil, including clay, loam, sand, and decomposed granite. Tests 1–7 were performed indoors. Therefore, grow lights were used.

Two types of American Excelsior Company mulch were used in the tests. Excel® Fibermulch contains 100% wood fiber. Fibercel™ Mulch contains 70% wood fiber and 30% recycled newsprint. These two types of mulch were used both with and without the standard American Excelsior Company guar tackifier.

Various types of native grass seed were added to the test mulches. The native seeds used in the tests included California Barley, Prostrate Form, Idaho Fescue, Berkeley Blue Wildrye, Zoro Fescue and California Poppy. The amount of seed added to the mulch composition was based on the average seed-per-acre recommendations of the California State Department of, Transportation (Caltrans). These recommendations vary according to the types of seed and the acreage to be covered.

The amount and type of fertilizer added to the mulch composition was determined by the soil type and condition. The fertilizers were added to the mulch composition in accordance with their manufacturers' recommendations.

American Excelsior Company recommends using one 50 lb. bag of their mulch for each added 100 gallons of water. For the purposes of this application, all references to "bags" of American Excelsior Company mulch will be considered to be 50 lb. bags. Test Examples 1–7 use a range of mulch to water ratios from ½ bag to 1½ bags per one hundred gallons of added water, including the factory recommended mulch to water ratio.

In Test Examples 1–7, hydro mix moisturizing agent in the form of a powder was added in a range of from 0.8 lb–2.4 lbs, inclusive to water and to mulch that did not contain the standard American Excelsior Company tackifier. The amounts of hydro mix moisturizing agent added to the mulches were based upon the weight of the moisturizing agent as a percentage of the volume of water by weight.

The results of Test Examples 1–7 indicated that the amounts of added fertilizer and seed had no effect on the mulch composition's water retention. In addition, the mulch to water ratio had little to no effect on the water retention of the mulch composition.

TABLE 2

| TEST EXAMPLE | CONCENTRATION OF MOISTURIZING AGENT | BINDING PROPERTIES | WATER RETENTION | SEED GERMINATION |
|---|---|---|---|---|
| 1 | 0.05% | Superior to standard tackifier. | Equal to mulch with standard tackifier | Fair. |
| 2 | 0.1% | Excellent tackifier. | Considerably better than mulch with standard tackifier. | Excellent. |
| 3 | 0.15% | Superior tackifier. | Excellent water retention properties. | Excellent. |
| 4 | 0.2% | Superior tackifier. | Superior water retention properties. | Excellent. |
| 5 | 0.25% | Super superior tackifier. | | Excellent seed germination, but some plants were not able to push through. |
| 6 | 0.3% | Super superior tackifier. | | 50–60% of plants could not push through. |
| 7 | 0.35% | Super superior tackifier | | 50–60% of plants could not push through. |

The results of Test Examples 5–7 indicated that, as the concentration of hydro mix moisturizing agent is increased, a crust begins to form on the top of the mulch. As the concentration of hydro mix moisturizing agent approaches 0.25%, the plants that have germinated from the seeds in the mulch begin to have difficulties in pushing through the mulch. However, the mulch compositions having the higher concentrations of hydro mix moisturizing agent also exhibit increased erosion control properties.

In arid areas, irrigation must be rapidly started to insure germination of the seeds as well as to sustain the newly-germinated plants. The water retention properties of the mulch compositions used in Test Examples 1–7 all extended the period before irrigation must be started. In Test Examples 4 and 5, the period before irrigation must be started was extended from one day to from three to seven days. In non-arid areas, the mulch compositions of Test Examples 4 and 5 may eliminate entirely the necessity for irrigation.

The soil used in the tanks was dry, with the only added moisture being the water applied with the mulch composition. Seeds that take 25 days to germinate were added to the mulch compositions used in Test Examples 3 and 4. These seeds did germinate 25 days after planting, without any additional water being supplied. In the other Test Examples, seeds that take 7–10 days to germinate germinated in the expected time. The grasses that germinated grew to an eventual height of 5–6 inches and lived for between 20 and 30 days after planting, without additional water being supplied.

TEST EXAMPLES 8–12

In Test Examples 8–12 the mulch compositions were sprayed onto an embankment having an approximately 10% grade. American Excelsior Company Excel® Fibermulch was used for Test Examples 8–12. Each batch of mulch was mixed with 1,500 gallons of added water. The same amount of added seed was also added to each batch of mulch. The amount of seed added to each batch is not considered to be significant to the test results. The hydro mix moisturizing agent, in anhydrous powder form, was also added in varying amounts to the mulches. No tackifiers were added to the mulch compositions of Test Examples 8–11. Test Example 12 contained tackifier but no added hydro mix moisturizing agent.

TABLE 3

| TEST EXAMPLE | CONCENTRATION OF MOISTURIZING AGENT | AMOUNT OF MULCH | WEIGHT OF MOISTURIZING AGENT (by weight relative to the weight of the water) | WEIGHT OF WATER | WATER RETENTION |
|---|---|---|---|---|---|
| 8 | 0.1% | 11 bags | 12 lbs. | 12,000 lbs. (1,500 gallons) | A small amount of water leached from the mulch and down the embankment. |
| 9 | 0.15% | 11 bags | 18 lbs. | 12,000 lbs. | No leaching of water from the mulch. |
| 10 | 0.2% | 11 bags | 24 lbs. | 12,000 lbs. | No leaching. |
| 11 | 0.25% | 6 bags | 30 lbs. | 12,000 lbs. | No leaching. |
| 12 | 0.0% | 11 bags | 0 | 12,000 lbs. | Water continued to leach out of the mulch 30 minutes after application of the mulch to the sloped surface. A large percentage of the added water leached away, leaving little moisture to enhance germination and rooting of the seeds. |

TEST EXAMPLES 13–14

In Test Examples 13 and 14, the mulch compositions according to the present invention were sprayed onto a new schoolyard in Floyd Knobs, Indiana. The mulch compositions and test conditions for Test Examples 13 and 14 are provided in Table 4, below. The results of the tests are listed in Table 5, below. The moisturizing agent added to the mulches in Test Examples 13–14 was the hydro mix moisturizing agent.

TABLE 4

| | |
|---|---|
| Product Combination: | American Excelsior Company Excel ® 5/16 inch fiber blend moisturizing agent powder No tackifier |
| Test Site and Soil Conditions: | Dry, relatively soft clay soil. One 3:1 slope, mostly flatter ground |
| Weather: | 85 degrees, very sunny, wind 12–15 knots |
| Equipment: | 1500 gallon Finn tank |

TABLE 5

| TEST EXAMPLE | CONCENTRATION OF MOISTURIZING AGENT | COMPOSITION | MIXING PROCEDURE | RESULTS |
|---|---|---|---|---|
| 13 | 0.1% | 12 bags Excel ® fiber 150 lbs. seed 200 lbs. fertilizer 1500 gallons water 12 lbs. moisturizing agent powder [1500 gal. × 8 lb./gal. 12,000 lbs. × .001 = 12 lbs. moisturizing agent powder.] | Tank first filled with water, then fiber, seed, fertilizer. Moisturizing agent was then poured slowly from end of bag. Moisturizing agent mixing took one minute. | 1. Moisturizing agent was excellent as a tackifier. 2. Moisture remained on the surface for 1 hour. Moisture was still present ¼–1 inch below the soil surface after 3 hours. 3. Spraying consistency was excellent, with no clogging of equipment. 4. No loss of product, slight loss in soil. Trickle loss on 3:1 slope. 5. Germination started in seven days. |
| 14 | 0.2% | 12 bags Excel ® fiber 150 lbs. seed 200 lbs. fertilizer 1500 gallons water 24 lbs. moisturizing agent powder | Tank first filled with water, then fiber, seed, fertilizer. Moisturizing agent was then poured slowly from end of bag. Moisturizing agent mixing took one minute. | 1. Superior tackifier. 2. Moisture apparent to 1 inch depth after 2 hours 3. Excellent dust control in a heavily sprayed area. 4. No loss of soil or product on 3:1 slope and upward area of slope. 5. Germination started in seven days. |

TEST EXAMPLES 15–19

In Test Examples 15–19, the compositions according to the present invention were sprayed onto a test site located in Santa Rosa, Calif. The compositions and test conditions for Test Examples 15–19 are provided in Table 6, below. The results of the tests are listed in Table 6, below. The moisturizing agent added to the mulches in Test Examples 15–19 was the hydro mix moisturizing agent.

TABLE 6

| | |
|---|---|
| Product Combination: | 1. Moisturizing Agent Combinations:<br>American Excelsior Company Excel ®<br>5/16 inch fiber blend<br>Moisturizing agent powder<br>No tackifier<br>2. Comparison Combination<br>5/16 inch Excel ® mulch blend with guar tackifier |
| Test Site and<br>Soil Conditions: | All sites - 75 × 150 feet.<br>Reddish-type firm clay and minor stone content<br>Moisturizing Agent sites:<br>2:1 slope<br>Comparison site (Test Example 19):<br>3:1 slope |
| Weather: | Cool, with temperature of 55–65 degrees.<br>Windy, with wind of approximately 15 knots plus or minus 10 knots.<br>Mostly overcast, very little sun. |
| Equipment: | 3,000 gallon tank with auger type agitator and high horsepower motor. |

TABLE 7

| TEST EX-AMPLE | CONCENTRATION OF MOISTURIZING AGENT | COMPOSITION | RESULTS |
|---|---|---|---|
| 15 | 0.1% | 11 bags Excel ® fiber<br>Native grass seed mix - earliest germination time - 14 days<br>1500 gallons water<br>2 lbs. moisturizing agent powder<br>[1500 gal. × 8 lb./gal. = 12,000 lbs. × .001 = 12 lbs. moisturizing agent powder.] | 1. Moisturizing agent was excellent as a tackifier.<br>2. Mix and spray application was excellent.<br>3. Mulch did not move once applied.<br>4. Mulch covered soil conditions and dirt clods (moisture apparent to 1/4–1/2 inch inside cross-section of dirt clod).<br>4. Water from seeder did not run down slope, but stayed at the place of landing. |
| 16 | 0.15% | 11 bags Excel ® fiber<br>Native grass seed mix - earliest germination time - 14 days<br>1500 gallons water<br>18 lbs. moisturizing agent powder<br>No tackifier. | 1. Excellent tackifier<br>2. Mix and spray application was excellent.<br>3. Moisture found in top 1/2 inch of clay soil. |
| 17 | 0.20 | 11 bags Excel ® fiber<br>Native grass seed mix - earliest germination time - 14 days<br>1500 gallons water<br>24 lbs. moisturizing agent powder<br>No tackifier. | 1. Excellent tackifier.<br>2. Excellent mix and spray application.<br>3. Moisture and mulch remained in place and provided excellent coverage.<br>4. Moisture in subgrade to 1 inch below surface.<br>5. This composition also exhibits good dust control properties. |
| 18 | 0.25 | 6 bags Excel ® fiber<br>Native grass seed mix - earliest germination time - 14 days<br>1500 gallons water<br>30 lbs. moisturizing agent powder<br>No tackifier. | 1. Moisture and mulch remained in place and molded to everything it contacted.<br>Composition provided excellent coverage.<br>2. Moisture in soil to 1 inch below surface. |
| 19 | 0 | 10 bags Excel ® fiber<br>Native grass seed mix - earliest germination time - 14 days<br>1500 gallons water<br>Guar tackifier | 1. Mulch mixed fairly well, and sprayed well, but some guar tackifier balls were sprayed during the application.<br>2. Trickles from water run off were observed in the soil. The water was not absorbed into the soil as well as the moisturizing agent compositions, but puddled and ran down the slope. Water was observed running down below the mulch application areas of the 3:1 slope.<br>3. Some of the mulch was observed to also flow down the slope. |

The results of Test Examples 15–19 clearly demonstrated the superior performance of the mulch composition according to the present invention. Unlike the prior art mulch, the mulch composition according to the present invention provided water both at and below the soil surface. The present invention also can serve as an effective dust control product.

Based upon the results of all tests, the presently preferred embodiment of the invention includes between 0.15%–0.25% of hydro mix moisturizing agent by weight as a percentage of the volume of added water by weight. More preferably, the preferred embodiment of the present invention includes 0.20% of hydro mix moisturizing agent by weight as a percentage of the volume of added water by weight.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

For example, the teachings of the present invention can readily be applied to mulch compositions having any appropriate amounts and types of moisturizing agent or mulch. Such types of mulch can include prior art mulches formed of relatively large particles, such as wood fibers, straw, and sawdust. Furthermore, the amounts of seed, water, and fertilizer that are added to a mulch composition according to the present invention can also be varied. It is not necessary to add seed or fertilizer at all. The erosion control properties of the present invention are evident with a composition consisting of mulch fiber and moisturizing agent, to which water is added. The mulch composition can also include any other additives, such as colorants or preservatives, that do not significantly affect the desirable properties of the mulch composition.

The composition according to the present invention can be applied to a surface by any appropriate means, including spraying, or manual application. Additionally, the mulch composition according to the present invention can be mixed by any appropriate means including automatic agitators or manual mixing.

What is claimed is:

1. A method for providing a moisturizing agent comprising the step of mixing a cellulosic compound, a cross-linker, and a surfactant wherein the cross-linker is a hydrated metallic salt selected from the group consisting of aluminum sulfate, zinc sulfate, indium sulfate, cadmium sulfate, and gallium sulfate.

2. A method for providing a mulch composition, comprising the steps of:
   adding water to a tank;
   adding mulch fiber to the water;
   adding seed to the water;
   adding fertilizer to the water;
   adding powdered moisturizing agent to the water; and
   mixing the water, mulch fiber, seed, fertilizer and moisturizing agent.

3. A method for providing a mulch composition, comprising the steps of:
   adding water to a tank;
   adding mulch fiber to the water;
   adding powdered moisturizing agent to the water; and
   mixing the water, mulch fiber, and moisturizing agent;
   wherein the moisturizing agent binds with the water.

4. The method of claim 3, further comprising the steps of:
   adding seed to the water after the step of adding mulch fiber and before the step of adding moisturizing agent; and
   adding fertilizer to the water after the step of adding the seed.

5. The method of claim 3, wherein the powdered moisturizing agent comprises:
   (a) cellulose gum ranging from approximately 85% to 95%;
   (b) aluminum sulfate ranging from approximately 5.00% to 15%; and
   (c) surfactant ranging from approximately 0.03% to 0.08%.

6. The method of claim 5, wherein the powdered moisturizing agent comprises:
   (a) 92.95% cellulose gum;
   (b) 7.00% aluminum sulfate; and
   (c) 0.05% water softener containing a surfactant comprising a member selected from the group consisting of sodium sesquicarbonate and sodium tripolyphosphate.

7. The mulch composition produced according to the method of claim 3.

8. A moisturizing agent comprising:
   (a) cellulosic compound;
   (b) a cross-linker;
   (c) a surfactant;
   (d) cellulose gum ranging from approximately 85% to 95%;
   (e) aluminum sulfate ranging from approximately 5.00% to 15%; and
   (f) surfactant ranging from approximately 0.03% to 0.08%.

9. The moisturizing agent according to claim 8, further comprising:
   (a) 92.95% cellulose gum;
   (b) 7.00% aluminum sulfate; and
   (c) 0.05% water softener containing a surfactant comprising a member selected from the group consisting of sodium sesquicarbonate and sodium tripolyphosphate.

10. The mulch composition according to claim 8, wherein the surfactant comprises a member selected from the group consisting of sodium sesquicarbonate, sodium tripolyphosphate, irgasan, trichlorocarbanilide and 3-(4-chlorophenyl-1-(3,4-dichlorophenyl)-urea.

11. A moisturizing agent comprising:
    (a) cellulosic compound;
    (b) a cross-linker; and
    (c) a surfactant wherein the cross-linker is a hydrated metallic salt selected from the group consisting of aluminum sulfate, zinc sulfate, indium sulfate, cadmium sulfate and gallium sulfate.

12. A mulch composition comprising:
    mulch in an amount ranging from approximately 4.4% to 7.3% by weight;
    a moisturizing agent for incorporation into the mulch in an amount ranging from approximately 0.05% to 0.35% by weight as a percentage of the volume of added water by weight; and
    water in an amount ranging from approximately 92.4% to 95.4% by weight.

13. The mulch composition according to claim 12, comprising:
    mulch in the amount of 5.85% by weight;
    moisturizing agent in the amount of 0.20% by weight as a percentage of the volume of added water by weight; and
    water in an amount of 93.95% by weight.

14. The mulch composition according to claim 12, wherein the mulch comprises about 70% wood fiber and about 30% recycled newsprint.

15. The mulch composition according to claim 12, wherein the moisturizing agent comprises:
    (a) cellulosic compound;
    (b) a cross-linker; and
    (c) a surfactant.

16. The mulch composition according to claim 15, wherein the moisturizing agent comprises:
    (a) cellulose gum ranging from approximately 85% to 95%;
    (b) aluminum sulfate ranging from approximately 5.00% to 15%; and
    (c) surfactant ranging from approximately 0.03% to 0.08%.

17. The mulch composition according to claim 16, wherein the moisturizing agent comprises:
    (a) 92.95% cellulose gum;
    (b) 7.00% aluminum sulfate; and
    (c) 0.05% water softener containing a surfactant comprising a member selected from the group consisting of sodium sesquicarbonate and sodium tripolyphosphate.

18. The mulch composition according to claim 15, wherein the surfactant comprises a member selected from the group consisting of sodium sesquicarbonate, sodium tripolyphosphate, irgasan, trichlorocarbanilide and 3-(4-chlorophenyl-1-(3,4-dichlorophenyl)-urea.

19. A mulch composition, comprising:
a mulch comprising ingredients selected from the group consisting of wood fiber straw sawdust, and recycled newsprint; and
moisturizing agent of from approximately 0.05% to 0.35% by weight as a percentage of the volume of added water by weight for incorporation into the mulch, the moisturizing agent comprising:
(a) cellulose gum ranging from approximately 85% to 95%;
(b) aluminum sulfate ranging from approximately 5.00% to 15%; and
(c) surfactant ranging from approximately 0.03% to 0.08%;
wherein water can be added to the mulch composition and retained for controlled distribution.

20. The mulch composition according to claim 19, wherein the moisturizing agent comprises:
(a) 92.95% cellulose gum;
(b) 7.00% aluminum sulfate; and
(c) 0.05% water softener containing a surfactant comprising a member selected from the group consisting of sodium sesquicarbonate and sodium tripolyphosphate.

21. The mulch composition according to claim 19, wherein the mulch comprises 100% wood fiber.

22. The mulch composition according to claim 19, wherein the mulch comprises approximately 70% wood fiber and approximately 30% recycled newsprint.

23. The mulch composition according to claim 19, comprising:
mulch in an amount ranging from approximately 4.5% to 7.00% by weight;
moisturizing agent in an amount ranging from approximately 0.05% to 0.35% by weight as a percentage of the volume of added water by weight; and
water in an amount ranging from approximately 92.35% to 95.45% by weight.

24. The mulch composition according to claim comprising:
mulch in the amount of 5.85% by weight as a percentage of the volume of added water by weight;
moisturizing agent in the amount of 0.20% by weight as a percentage of the volume of added water by weight; and
water in the amount of 93.95% by weight.

25. The mulch composition according to claim 19, further comprising seed.

26. The mulch composition according to claim 19, further comprising fertilizer.

27. A method for providing a moisturizing agent comprising the step of mixing a cellulosic compound, a cross-linker, and a surfactant and further comprising the step of mixing cellulose gum ranging from approximately 85% to 95%, aluminum sulfate ranging from approximately 5.00% to 15%, and surfactant ranging from approximately 0.03% to 0.08%.

28. A mulch composition according to claim 27, wherein the surfactant comprises a member selected from the group consisting of sodium sesquicarbonate, sodium tripolyphosphate, irgasan, trichlorocarbanilide and 3-(4-chlorophenyl-1-(3,4-dichlorophenyl)-urea.

* * * * *